United States Patent
Murakawa

(10) Patent No.: US 10,490,017 B2
(45) Date of Patent: Nov. 26, 2019

(54) NETWORK SYSTEM, IMAGE FORMING APPARATUS, INFORMATION PROCESSING PROGRAM, AND PORTABLE INFORMATION TERMINAL

(71) Applicant: KONICA MINOLTA, INC., Chiyoda-ku, Tokyo (JP)

(72) Inventor: Akira Murakawa, Toyonaka (JP)

(73) Assignee: KONICA MINOLTA, INC., Tokyo (JP)

( * ) Notice: Subject to any disclaimer, the term of this patent is extended or adjusted under 35 U.S.C. 154(b) by 24 days.

(21) Appl. No.: 15/985,148

(22) Filed: May 21, 2018

(65) Prior Publication Data

US 2018/0374295 A1 Dec. 27, 2018

(30) Foreign Application Priority Data

Jun. 21, 2017 (JP) .................................. 2017-121143

(51) Int. Cl.
| | |
|---|---|
| G07F 17/26 | (2006.01) |
| G06F 3/12 | (2006.01) |
| G06Q 20/32 | (2012.01) |
| G07F 7/12 | (2006.01) |
| G06Q 20/34 | (2012.01) |
| G07F 7/08 | (2006.01) |

(52) U.S. Cl.
CPC .......... *G07F 17/266* (2013.01); *G06F 3/1236* (2013.01); *G06F 3/1278* (2013.01); *G06Q 20/322* (2013.01); *G06Q 20/3274* (2013.01); *G06Q 20/352* (2013.01); *G07F 7/0873* (2013.01); *G07F 7/122* (2013.01)

(58) Field of Classification Search
None
See application file for complete search history.

(56) References Cited

U.S. PATENT DOCUMENTS

| | | | |
|---|---|---|---|
| 2015/0036176 A1* | 2/2015 | Naruse | H04N 1/00925 358/1.15 |
| 2017/0192727 A1* | 7/2017 | Yun | G06F 3/1211 |
| 2017/0337016 A1* | 11/2017 | Lee | G06F 3/1203 |

FOREIGN PATENT DOCUMENTS

| | | |
|---|---|---|
| JP | 2006058566 A | 3/2006 |
| JP | 2007299293 A | 11/2007 |

* cited by examiner

Primary Examiner — Kristy A Haupt
(74) *Attorney, Agent, or Firm* — Holtz, Holtz & Volek PC

(57) ABSTRACT

There is provided a network system capable of making communication between a portable information terminal and an image forming apparatus, the network system including: a charging processor that performs a charging processing, wherein the image forming apparatus includes: a first communication part that makes communication in a first communication system; a second communication part that makes communication in a second communication system; and an information reader that reads card information, the portable information terminal includes: a first terminal communication part that makes communication in the first communication system; a second terminal communication part that makes communication in the second communication system; and a card emulator that is operated in a card emulation function, the information reader reads card information of a card emulated in the card emulation function from the portable information terminal and the charging processor starts the charging processing, and performs the charging processing.

13 Claims, 3 Drawing Sheets

NETWORK SYSTEM, IMAGE FORMING APPARATUS, INFORMATION PROCESSING PROGRAM, AND PORTABLE INFORMATION TERMINAL

The entire disclosure of Japanese patent Application No. 2017-121143, filed on Jun. 21, 2017, is incorporated herein by reference in its entirety.

BACKGROUND

Technological Field

The present disclosure relates to a network system, an image forming apparatus, an information processing program, and a portable information terminal.

Description of the Related Art

Transaction with electronic money may be used as a transaction solution when a person makes prints for a price by the copy function or printer function in an image forming apparatus such as multi-functional peripheral (MFP) installed in a shop such as convenience store or in a public facility. Transaction with electronic money is conducted by use of card information of IC card, and the like, is easier in user's operation than transaction with cash, and will spread in place and opportunity.

A user has to do a plurality of operations for causing his/her card information to be read in one-time printing in some image forming apparatuses for transaction with electronic money (JP 2006-58566 A and JP 2007-299293 A). For example, an estimated price is set before printing in an image forming apparatus, and when a user performs the first operation of causing card information to be read such as touch operation, the charging processing and the like are performed. When the user performs the second operation of causing card information to be read such as touch operation again after printing is performed, a difference from the estimated price is displayed, and the processing of charging the difference is performed.

However, there is a problem that card information needs to be read several times in one-time printing in a conventional image forming apparatus for performing the charging processing as described above, and user's operations are complicated.

SUMMARY

The present disclosure has been made in terms of such a situation, and an object thereof is to facilitate user's operations.

To achieve the abovementioned object, according to an aspect of the present invention, there is provided a network system, reflecting one aspect of the present invention, capable of making communication between a portable information terminal and an image forming apparatus, the network system comprising: a charging processor that performs a charging processing for image forming in the image forming apparatus, wherein the image forming apparatus comprises: a first communication part that makes communication in a first communication system; a second communication part that makes communication in a second communication system; and an information reader that reads card information, the portable information terminal comprises: a first terminal communication part that makes communication in the first communication system; a second terminal communication part that makes communication in the second communication system; and a card emulator that is operated in a card emulation function, the information reader reads card information of a card emulated in the card emulation function from the portable information terminal when communication is made with the portable information terminal in the first communication system by the first communication part and the first terminal communication part, and the charging processor starts the charging processing when the card information of the portable information terminal is read by the information reader, and performs the charging processing when communication is made between the portable information terminal and the image forming apparatus in the second communication system by the second terminal communication part and the second communication part.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
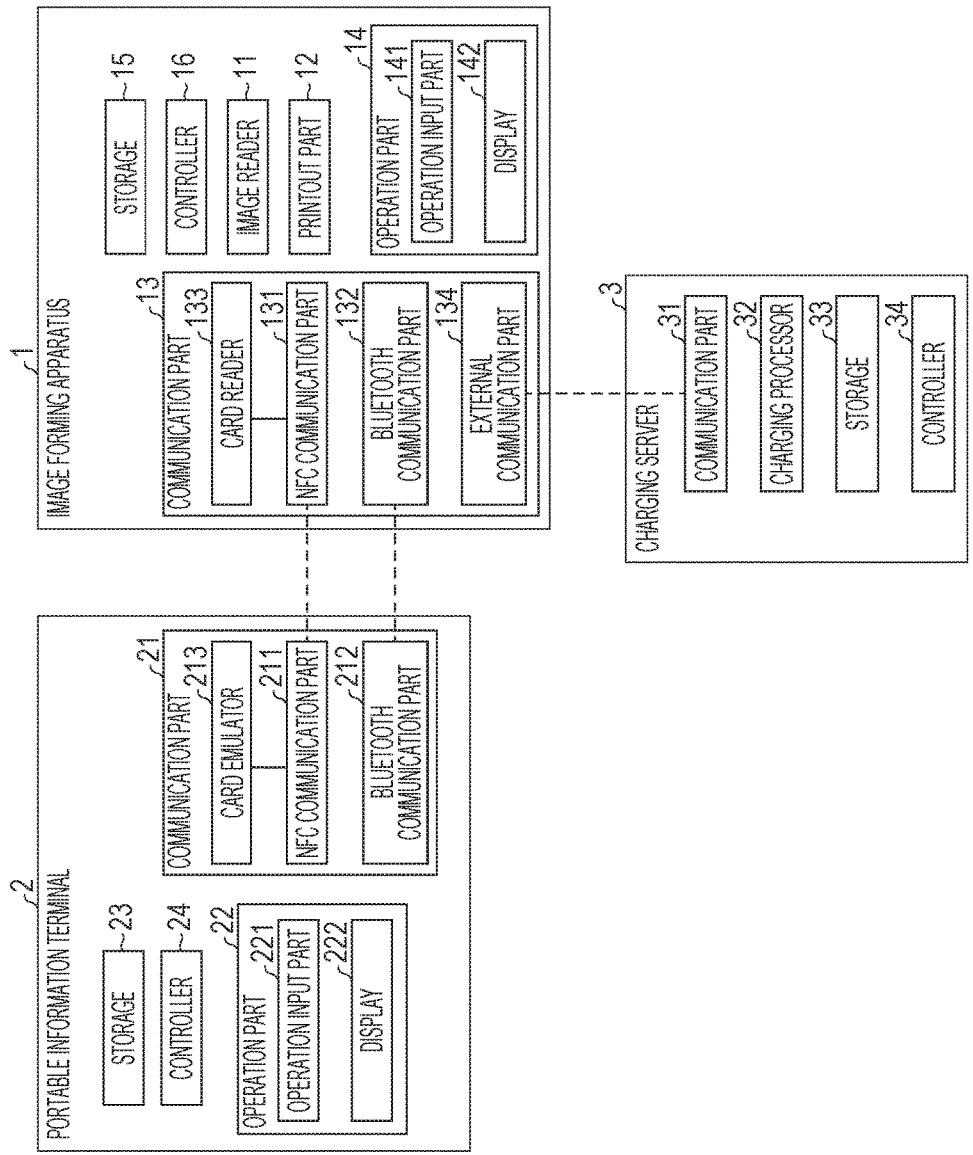
FIG. 1 is a diagram illustrating a configuration of a network system.

Hereinafter, one or more embodiments of a network system of the present invention will be described with reference to the drawings. However, the scope of the invention is not limited to the disclosed embodiments. The same parts and components are denoted with the same reference numerals in the following description. They are also denoted with the same names and functions, respectively. Thus, the description thereof will be omitted.

[Outline of Configuration of Network System]

FIG. 1 is a diagram illustrating a configuration of a network system 10 as a communication system. As illustrated in FIG. 1, the network system 10 includes a portable information terminal 2, an image forming apparatus 1 capable of making communication with the portable information terminal 2, and a charging server 3 capable of making communication with the image forming apparatus 1.

The image forming apparatus 1 and the portable information terminal 2 make mutual communication by use of various near field wireless communication techniques. The near field wireless communication techniques employ communication in the near field communication (NFC) standard (which will be denoted as NFC communication below), and communication in the Bluetooth (registered trademark) standard (which will be denoted as Bluetooth communication below) between the image forming apparatus 1 and the portable information terminal 2.

[Configuration of Image Forming Apparatus]

By way of example, the image forming apparatus 1 is a multi-functional peripheral (MFP) as a combined machine including a scan function, a copy function, a printer function, a facsimile function, a box storage function, and the like. The image forming apparatus 1 includes an image reader 11, a printout part 12, a communication part 13, an operation part 14, a storage 15, and a controller 16, and causes the respective parts to operate in a combined manner thereby to realize various functions.

The image reader 11 is a processor for optically reading (or scanning) a document placed at a predetermined position of the image forming apparatus 1 thereby to generate image data (which will be denoted as document image or scanned image) of the document. The image reader 11 is also denoted as scan part. The printout part 12 is a processor for printing out an image on various mediums such as sheet on the basis of data to be printed.

The communication part 13 is a processor capable of making facsimile communication and data communication via a public line (such as Internet). The communication part 13 can make various wireless communication (such as wireless communication via wireless LAN) including near field wireless communication such as NFC communication and Bluetooth communication. Further, the communication part 13 can make wired communication via a wired LAN or the like.

The communication part 13 includes a NFC communication part 131, a Bluetooth communication part 132, a card reader 133, and an external communication part 134. The NFC communication part 131 makes network communication with the portable information terminal 2 and the like via NFC communication. In NFC communication made by the NFC communication part 131, card information based on the card emulation function in a portable information terminal is received by the NFC communication part 131 and read by the card reader 133. Network communication using Bluetooth communication is made with the portable terminal information 2 and the like in the Bluetooth communication part 132. Bluetooth communication made by the Bluetooth communication part 132 is used as a condition for continuously performing the charging processing for image forming in the image forming apparatus 1 such as printing in the copy operation and printer operation.

The external communication part 134 is communicably connected to the charging server 3 provided outside a place where the image forming apparatus 1 is installed via an external communication line including LAN such as wireless LAN or wired LAN, or Internet. When image forming is performed in the image forming apparatus 1, the external communication part 134 transmits the card information read by the card reader 133 and the charging information for the image forming in the image forming apparatus 1 to the charging server 3.

The storage 15 is configured of a storage device such as hard disc drive (HDD).

The operation part 14 includes an operation input part 141 for receiving operation input into the image forming apparatus 1, and a display 142 for displaying and outputting various items of information.

The image forming apparatus 1 is provided with an operation panel substantially in a plate shape. The operation panel has a touch panel on its front. The touch panel functions as part of the operation input part 141 and also functions as part of the display 142. The touch panel is configured such that various sensors are embedded in the liquid crystal display panel, and can display various items of information and can receive various operation input by an operator.

The controller 16 is incorporated in the image forming apparatus 1, and collectively controls the image forming apparatus 1. The controller 16 is configured as a computer system including a CPU and various semiconductor memories (RAM and ROM). The controller 16 causes the CPU to execute information processing programs (which will be simply denoted as programs below) as software programs stored in the ROM or the like, thereby realizing various processors. The programs (a group of program modules in detail) may be recorded in a portable recording medium such as USB memory, and may be installed in the image forming apparatus 1 via the recording medium. Alternatively, the programs may be downloaded via a network and installed in the image forming apparatus 1.

The controller 16 executes the programs thereby to realize various processors including a communication controller, an input controller, and a display controller. The communication controller is a processor for controlling a communication operation with other apparatus (such as the portable information terminal 2) in cooperation with the communication part 13 or the like. The communication controller has a transmission controller for controlling an operation of transmitting various items of data and a reception controller for controlling an operation of receiving various items of data. The communication controller controls an operation of pairing with a connection source apparatus in cooperation with the communication part 13.

The input controller is directed for controlling operation input into the operation input part 141 (such as touch panel). For example, the input controller controls the operation of receiving operation input on the operation screen displayed on the touch panel.

The display controller is a processor for controlling a display operation on the display 142 (such as touch panel). The display controller displays an operation screen or the like for operating the image forming apparatus 1 on the touch panel 25.

[Configuration of Portable Information Terminal]

The portable information terminal 2 is an information I/O terminal (information terminal) capable of network communication with the image forming apparatus 1. The portable information terminal 2 employs a Smartphone by way of example. The portable information terminal 2 may be a tablet terminal or the like.

The portable information terminal 2 includes a communication part 21, a storage 23, an operation part 22, and a controller 24, and causes the parts to operate in a combined manner thereby to realize various functions.

The communication part 21 can make various wireless communication (including wireless communication via wireless LAN) including near field wireless communication such as NFC communication and Bluetooth communication similarly to the communication part 13 in the image forming apparatus 1 in addition to the communication function (not illustrated) of the cell phone. Further, the communication part 13 can make wired communication via wired LAN or the like.

The communication part 21 includes a NFC communication part 211, a Bluetooth communication part 212, and a card emulator 213. The NFC communication part 211 makes network communication with the image forming apparatus 1 and the like by use of the NFC communication part. The card emulator 213 emulates a card capable of transaction such as IC card for electronic money of the owner of the portable information terminal 2 thereby to perform the card emulation processing for enabling the card transaction to be made by the function of the portable information terminal 2 by use of the NFC function of the portable information terminal 2. Specifically, the card emulator 213 is configured in a hardware circuit. The card emulator 213 may be configured of the CPU of the controller 24. Further, the card emulator 213 is desirably configured in a hardware circuit in terms of security.

In NFC communication made by the NFC communication part 211, the card information based on the card emulation function of the card emulator 213 is transmitted to the NFC communication part 131 in the image forming apparatus 1. The Bluetooth communication part 212 makes network communication with the Bluetooth communication part 132 of the image forming apparatus 1 via Bluetooth communication.

The storage 23 is configured of a storage device such as nonvolatile semiconductor memory. The storage 23 stores control programs (such as application programs) executed by the controller 24, or various screens (their display data in detail). Further, the storage 23 stores priority setting information for making communication with the image forming apparatus 1 as connection destination candidate (connection candidate apparatus) via Bluetooth communication.

The operation part 22 includes an operation input part 221 for receiving operation input into the portable information terminal 2, and a display 222 for displaying and outputting various items of information. A touch panel with various sensors embedded is provided in the liquid crystal display panel in the portable information terminal 2. The touch panel functions as part of the operation input part 221 and also functions as part of the display 222.

The controller 24 is incorporated in the portable information terminal 2 and is directed for collectively controlling the portable information terminal 2. The controller 24 is configured as a computer system including a CPU and various semiconductor memories (RAM and ROM). The controller 24 causes the CPU to execute the information processing programs (which will be simply denoted as programs below) as predetermined software programs stored in the storage 23 or the semiconductor memories thereby to realize various processors. The programs (a group of program modules in detail) are recorded in a portable recording medium such as USB memory, and may be installed in the portable information terminal 2 via the recording medium. Alternatively, the programs may be downloaded via a network or the like and installed in the portable information terminal 2.

Specifically, the controller 24 executes the programs thereby to realize various processors including a communication controller, an input controller, a display controller, a detector, a setting part, and a determination part.

The communication controller controls an operation of making communication with the image forming apparatus 1 and the like in cooperation with the communication part 21 or the like. Further, the communication controller also controls an operation of paring with a connection destination apparatus.

The input controller controls operation input into the operation input part 221 (such as touch panel). The display controller controls an operation of displaying various items of information on the display (such as touch panel).

[Configuration of Charging Server]

The charging server 3 is an information processor configured of a computer having a server function, and is installed outside a place where the image forming apparatus 1 is installed. The charging server 3 is provided to be capable of information communication with the image forming apparatus 1 via a communication network including LAN such as wireless LAN or wired LAN, or Internet.

The charging server 3 may be provided near a place where the image forming apparatus 1 is installed, or may be provided in an external facility such as data center provided away from the place. The charging server 3 may be provided as a server for a plurality of image forming apparatuses 1, or may be provided as a server for one image forming apparatus 1.

The charging server 3 includes a communication part 31, a charging processor 32, a storage 33, and a controller 34. The communication part 31 is configured to be connectable with the external communication part 134 via a communication network as described above. Thereby, network communication is made between the image forming apparatus 1 and the charging server 3. Further, the communication part 31 is configured to be connectable with a card information confirmation server in an electronic money management company via other communication network. The charging processor 32 is controlled by the controller 34, and performs the processing of charging for an operation of an image forming apparatus such as copying and printing in the image forming apparatus 1. The storage 33 is configured of a storage device such as hard disc drive (HDD).

The charging server 3 can receive card information via the communication part 31 under control of the controller 34, and can confirm whether the card information is true or false via information communication with the card information confirmation server of the electronic money management company or the like. Whether the card information is true or false is confirmed by confirming whether the card information corresponds to the card information registered in the electronic money management company.

The controller 34 is directed for collectively controlling the charging server 3. The controller 34 is configured as a computer system including a CPU and various semiconductor memories (RAM and ROM). The controller 34 causes the CPU to execute information processing programs (which will be simply denoted as programs below) as predetermined software programs stored in the ROM thereby to realize various processors. The programs (a group of program modules in detail) are recorded in a portable recording medium such as USB memory, and may be installed in the image forming apparatus 1 via the recording medium. Alternatively, the programs may be downloaded via a network and installed in the charging server 3.

The controller 34 executes the programs thereby to realize various processors including a communication controller and a charging controller. The communication controller is a processor for controlling an operation of making communication with other apparatus (such as the image forming apparatus 1) in cooperation with the communication part 31. The communication controller has a transmission controller for controlling an operation of transmitting various items of data and a reception controller for controlling an operation of receiving various items of data.

The charging controller is directed for controlling the processing of charging for an image forming processing such as paid printing in the copy operation and the print operation in the image forming apparatus 1. For example, when printing is performed for a charge in the copy operation in the image forming apparatus 1, the controller 34 performs the card-transaction charging processing on the basis of the card information of the card set by the portable information terminal 2 and read by the image forming apparatus. For example, when the copy operation is performed for a charge in the image forming apparatus 1, the card information of the card emulated by the portable information terminal 2 and the charging information caused by performing the image forming operation are acquired from the image forming apparatus 1 via information communication, and the charging processing is performed on the card on the basis of the acquired cad information and the acquired charging information whenever one sheet is printed.

[Flowchart of Charging Processing Based on Image Forming]

There will be described below a flow of various information processing such as charging processing when image forming is performed for a charge in the image forming apparatus 1 by use of the portable information terminal 2 in the network system 10 illustrated in FIG. 1.

Figure 2:
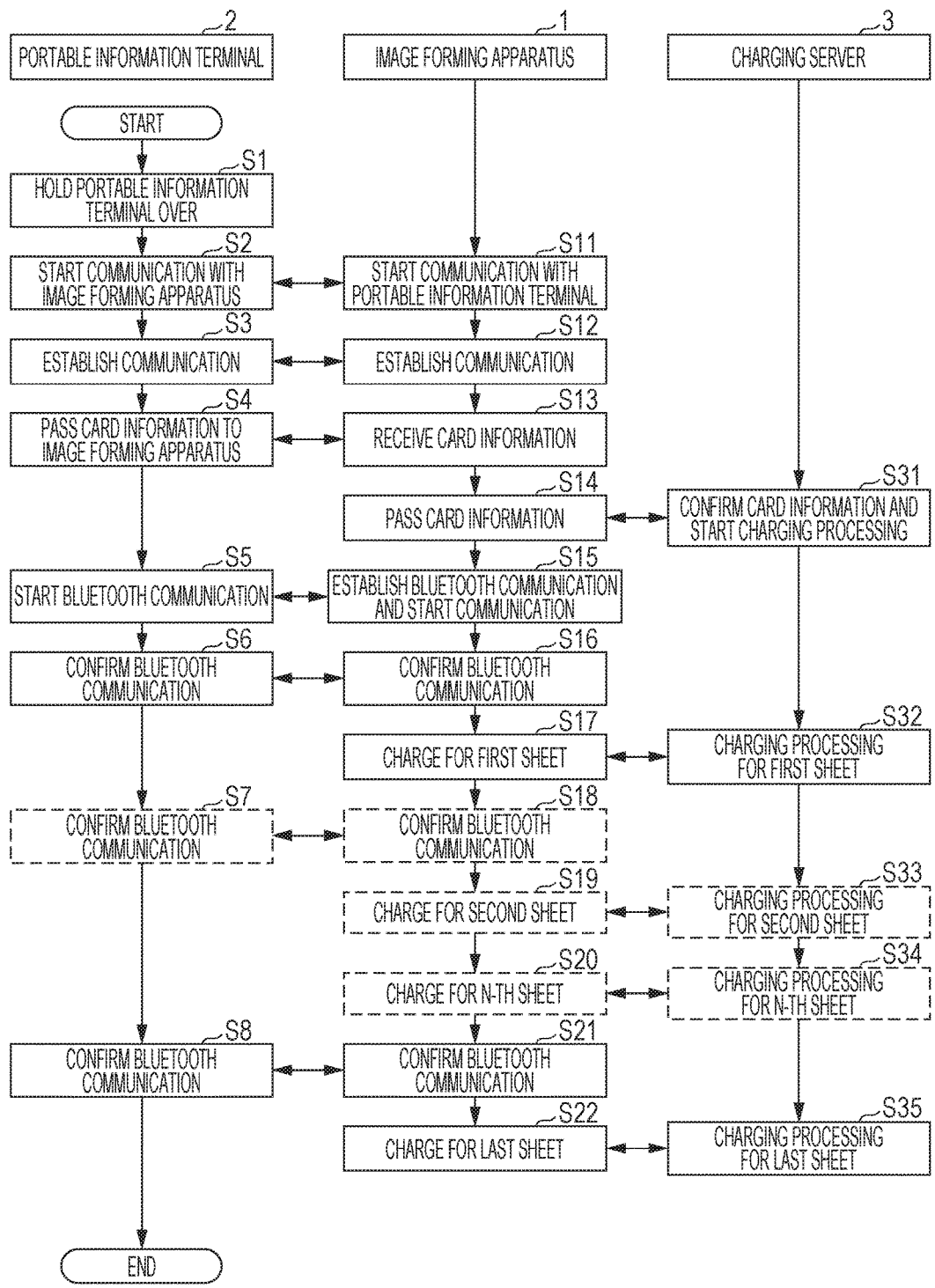
FIG. 2 is a flowchart illustrating a flow of various information processing such as charging processing when paid image forming is performed in an image forming apparatus by use of a portable information terminal.

FIG. 2 is a flowchart illustrating a flow of various information processing such as charging processing when image forming is performed for a charge in the image forming apparatus 1 by use of the portable information terminal 2.

FIG. 2 illustrates the processing performed in the image forming apparatus 1, the portable information terminal 2, and the charging server 3 in an associated manner. The CPU in the controller 16 executes specific programs so that the processing performed in the image forming apparatus 1 are realized. The CPU in the controller 24 executes predetermined programs so that the processing performed in the portable information terminal 2 are realized. The CPU in the controller 34 executes predefined programs so that the processing performed in the charging server 3 are realized.

When the image forming apparatus 1 starts performing image forming, at first mutual information communication is started via NFC communication between the NFC communication part 211 in the portable information terminal 2 and the NFC communication part 131 in the image forming apparatus 1 (step S (which will be denoted as S below) 2, S3) when the user holds the NFC communication part 211 provided at a predetermined position of the portable information terminal 2 over the NFC communication part 131 provided at a specific position of the image forming apparatus 1 (S1).

Thereafter, when communication is established between the NFC communication part 211 in the portable information terminal 2 and the NFC communication part 131 in the image forming apparatus 1 (S3, S12), the portable information terminal 2 makes information communication for passing the card information acquired by the card emulation function of the card emulator 213 to the image forming apparatus 1 via the NFC communication part 211 (S4). The image forming apparatus 1 then receives the card information via the NFC communication part 131 (S13), and then makes information communication for passing the received card information to the charging server 3 via the external communication part 134 (S14).

When receiving the card information via the communication part 31, confirming whether the card information is true or false via information communication with the card information confirmation server in the electronic money management company, and confirming that the card information is based on the true card, the charging server 3 starts the charging processing on the corresponding card on the basis of the card information acquired by the image forming apparatus 1 from the portable information terminal 2 (S31).

Then, information communication via Bluetooth communication is started in the Bluetooth communication part 212 in the portable information terminal 2 (S5). Information communication via Bluetooth communication is started and Bluetooth communication is established in the Bluetooth communication part 132 in the image forming apparatus 1 (S15). Thereby, Bluetooth communication is established between the portable information terminal 2 and the image forming apparatus 1, mutual information communication is made therebetween, and then whether the portable information terminal 2 and the image forming apparatus 1 are in the Bluetooth communication state is confirmed (S6, S16). Bluetooth communication is near field wireless communication, and the Bluetooth communication state is established when a paired communication apparatus is present within a predetermined communication distance with a predetermined radio intensity or more.

In this way, when a first sheet is printed in the image forming apparatus 1 while the portable information terminal 2 and the image forming apparatus 1 are confirmed to be in the Bluetooth communication state, the charging information of the first sheet is transmitted to the charging server 3 (S17), and the charging server 3 performs the charging processing on printing the first sheet (S32). Thereby, only when the portable information terminal 2 is within a predetermined communication distance from the image forming apparatus 1 in which they can be in the Bluetooth communication state, printing is performed and the charging processing is performed.

Printing and the charging processing may be performed while the portable information terminal 2 and the image forming apparatus 1 are in the Bluetooth communication state with a specific radio intensity or more required for keeping the Bluetooth communication state. Further, printing and the charging processing may be performed while the portable information terminal 2 and the image forming apparatus 1 are in the Bluetooth communication state with a predetermined radio intensity or more which is higher than the specific radio intensity required for keeping the Bluetooth communication state.

Thereafter, when the second and subsequent sheets are printed in the image forming apparatus 1 while the portable information terminal 2 and the image forming apparatus 1 are confirmed to be in the Bluetooth communication state (S7, S18), the charging information per sheet is transmitted to the charging server 3 (S19, S20), and the charging server 3 performs the charging processing per sheet (S33, S34).

Thereafter, when the last sheet (N-th sheet) is printed in the image forming apparatus 1 while the portable information terminal 2 and the image forming apparatus 1 are confirmed to be in the Bluetooth communication state (S8, S21), the charging information of printing the last sheet is transmitted to the charging server 3 (S22), and the charging server 3 performs the charging processing on the last sheet (S35).

If the charging processing based on image forming as illustrated in FIG. 2 is performed, printing is performed in the image forming apparatus 1 and the charging processing is performed in the charging server 3 whenever each sheet is printed while the portable information terminal 2 and the image forming apparatus 1 are confirmed to be in the Bluetooth communication state.

That is, the charging processing is started in the image forming apparatus 1 on the basis of the card information read from the portable information terminal 2 via NFC communication as first communication system, and then the charging processing is performed in the charging server 3 whenever each sheet is printed while the Bluetooth communication state as second communication system is confirmed between the portable information terminal 2 and the image forming apparatus 1. Thereby, even when printing ends due to unexpected situation such as jamming of sheets or shortage of sheets, the charging processing for printed sheets is performed, and thus the card information does not need to be read from the portable information terminal 2 to the image forming apparatus 1 again for payment after printing ends. Once the card information is read from the portable information terminal to the image forming apparatus 1 in one-time printing, the charging processing can be completed without causing the card information to be read from the portable information terminal 2 again, thereby facilitating user's operations.

[Other Exemplary Charging Processing]

While FIG. 2 illustrates the charging processing via card transaction whenever one sheet is printed in the image forming apparatus 1, the charged amount may be added whenever one sheet is printed in the image forming apparatus 1 and the total amount may be subjected to card transaction when the final printing ends. The charging processing will be described below by way of example.

Without the processing in S32, S33, and S34 in FIG. 2, in step S17, S19, and S20, the charged amount is added to the storage 15 in the image forming apparatus 1 thereby to update and store the total amount whenever one sheet is printed in the image forming apparatus 1, and in S22, the charging information of the total amount is transmitted to the charging server 3 on printing the last sheet, and the transmitted charging information of the total amount may be subjected to card transaction in the charging server 3 instead of S35.

[Exemplary Operations of Stopping or Continuing Image Forming Processing and Charging Processing]

The operations of stopping and continuing the processing while the image forming processing and the charging processing are performed in the network system 10 will be described below by way of example.

Figure 3:
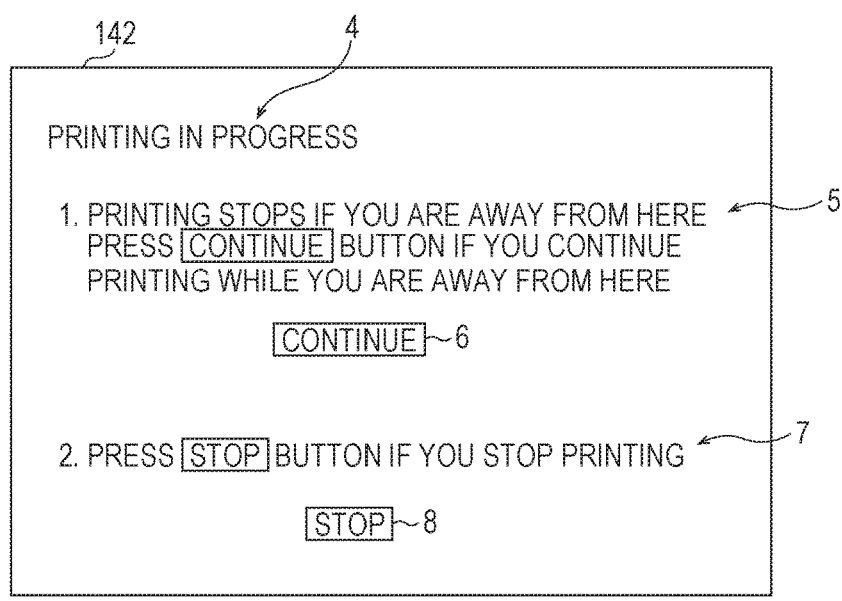
FIG. 3 illustrates an exemplary screen displayed on a display during printing in an image forming apparatus.

FIG. 3 illustrates an exemplary screen displayed on the display 142 while the image forming apparatus 1 is printing. With reference to FIG. 3, a continue button 6 and a stop button 8, which are configured of button icon images, respectively, are displayed while the image forming apparatus 1 is printing.

The continue button 6 is operable when the following function is performed. In the network system 10, if the Bluetooth communication state is eliminated between the portable information terminal 2 and the image forming apparatus 1 when the user owning the portable information terminal 2 is away from the image forming apparatus 1 at a predetermined distance or more, the image forming processing and the charging processing are not performed. Such a situation is not convenient for the user, and if the continue button 6 is previously operated, the image forming processing and the charging processing are exceptionally continued and performed even if the Bluetooth communication state is eliminated when the user owning the portable information terminal 2 is away from the image forming apparatus 1 at a predetermined distance or more.

Specifically, an image of print guidance display 4 for guiding printing in progress, such as "Printing in progress", is displayed on the display 142 in the screen displayed during printing in the image forming apparatus 1. For example, an image of continue operation guidance display 5 for guiding an operation of continuing printing and charging, such as "Printing stops if you are away from here. Press continue button if you continue printing while you are away from here.", is displayed on the screen of printing in progress while the user is away, and the button icon of the continue button 6 is displayed for the guidance.

When the continue button 6 is pressed during printing, the controller 16 in the image forming apparatus 1 controls continuously performing the image forming processing (printing) and the charging processing in the image forming apparatus 1 even if the Bluetooth communication state confirmed in S6 or S16 in FIG. 2 is not kept. Under such control, the printing processing and the charging processing are continued while the user is away even if the user carrying the portable information terminal 2 is away from the image forming apparatus 1, and thus printing can be completed while the user is away from the image forming apparatus 1 for a short time, thereby improving user's convenience.

The stop button 8 is operable when the following function is performed. In the network system 10, if printing needs to be stopped due to some reason while the user owning the portable information terminal 2 is printing in the image forming apparatus 1, the user carrying the portable information terminal 2 is away from the image forming apparatus 1 as far as the Bluetooth communication state is eliminated, thereby stopping printing. However, if the user carrying the portable information terminal 2 is away from the image forming apparatus 1 in order to receive the printed materials printed so far and to stop printing, the printing processing and the charging processing are not stopped if the user is away at a short distance, and are continued until he/she is away from as far as the Bluetooth communication state is eliminated, and thus printing is continued and the user cannot receive the printed materials to be charged.

Specifically, as illustrated in FIG. 3, an image of stop operation guidance display 7 for guiding an operation of stopping printing and charging, such as "Press stop button if you stop printing.", is displayed on the screen displayed on the display 142 during printing, and the button icon image of the stop button 8 is displayed for the guidance in the image forming apparatus 1.

When the stop button 8 is pressed during printing, the controller 16 in the image forming apparatus 1 controls forcibly stopping the printing and charging processing in progress. Under such control, the user can receive all the printed materials to be charged when printing is stopped, thereby preventing the printing and charging processing from being performed in vain.

[Exemplary Previous Notification to Stop Image Forming Processing and Charging Processing]

Previous notification to stop the image forming processing and the charging processing in the network system 10 will be described below by way of example.

In the network system 10, if the user carrying the portable information terminal 2 is away from the image forming apparatus 1 at a predetermined distance or more, for example, and the Bluetooth communication state is eliminated between the portable information terminal 2 and the image forming apparatus 1, the image forming processing and the charging processing are not performed. Some users do not grasp the communication mechanism, or can forget it if they have grasped.

Thus, the controller 16 in the image forming apparatus 1 monitors whether a predetermined radio intensity is kept during printing in the image forming apparatus 1 before the Bluetooth communication state is not kept, and when the predetermined radio intensity is reached, the controller 16 transmits data for notifying that printing is to be stopped from the Bluetooth communication part 132 in the image forming apparatus 1 to the Bluetooth communication part 212 in the portable information terminal 2 in the Bluetooth communication state. The controller 24 in the portable information terminal 2 which receives the data causes the display 222 to display a previous stop notification indicating a character image of a notification text such as "Printing stops if you are away from here.", for example.

When such a previous stop notification is displayed, it is possible to prevent a situation that the users who do not grasp the communication mechanism for printing in the network system 10 and the users who carelessly forget are away from the image forming apparatus 1 farther than is needed while carrying the portable information terminal 2 thereby to cause an unintentional printing stop state (for example, scheduled printing is not completed when the user is away from the image forming apparatus 1 and then returns).

[Exemplary Control to Restart Bluetooth Communication State]

There will be described below exemplary control to restart the Bluetooth communication state when the image forming processing and the charging processing are performed in the network system 10 within a predetermined time after the Bluetooth communication state is temporarily eliminated during printing.

In the network system 10, when the user owning the portable information terminal 2 is away from the image forming apparatus 1 at a predetermined distance or more, for example, and the Bluetooth communication state is eliminated between the portable information terminal 2 and the image forming apparatus 1, the image forming processing and the charging processing are not performed. When the user carrying the portable information terminal 2 is away from the image forming apparatus 1 due to some reason or when he/she is unintentionally away without any reason during printing in the image forming apparatus 1, a print stop state which the user does not intend can be caused.

Thus, the controller 16 in the image forming apparatus 1 temporarily interrupts the image forming processing and the charging processing when the Bluetooth communication state is eliminated during printing in the image forming apparatus 1, and a clock part such as timer counts a time after the Bluetooth communication state is eliminated. During time counting, if the Bluetooth communication state is restarted within a predetermined time after the Bluetooth communication state is eliminated, the controller 16 then restarts and continues the interrupted image forming processing, and restarts and continues the interrupted charging processing, thereby restarting and continuing the interrupted printing.

When the Bluetooth communication state is restarted, the image forming processing and the charging processing are restarted and continued as a solution for the user carrying the portable information terminal 2 who is away from the image forming apparatus 1 for a short time due to some reason during printing in the network system 10, and thus user's convenience can be improved.

There may be configured such that when the Bluetooth communication state is eliminated, data for notifying that printing is interrupted when the portable information terminal 2 is away from the image forming apparatus 1 is transmitted from the Bluetooth communication part 132 in the image forming apparatus 1 to the Bluetooth communication part 212 in the portable information terminal 2 in the Bluetooth communication state, the display 222 in the portable information terminal 2 makes such a notification and the user returns to the image forming apparatus 1 within a short time after reception of the notification thereby to restart the Bluetooth communication state. In this case, the image forming processing and the charging processing can be continued as a solution for the user who restarts the Bluetooth communication state within a short time after reception of the notification in terms of user's convenience.

[Exemplary Control to Confirm Portable Information Terminal to be Communicated]

There will be described below exemplary control to confirm a portable information terminal to be communicated in order to confirm that a portable information terminal which acquires card information on the basis of the card emulation function is the same as a portable information terminal which makes Bluetooth communication.

Control to confirm a portable information terminal to be communicated is conducted when key information used as security confirmation data is mutually exchanged between the image forming apparatus 1 and the portable information terminal 2 in the following communication procedure.

At first, at the start of information communication for passing the card information acquired by the card emulation function of the portable information terminal 2 to the image forming apparatus 1 via NFC communication, the controller 16 in the image forming apparatus 1 performs a key information generation processing, and stores the generated key information in the storage 15. The key information is generated to be different per generation timing. Information communication for transmitting the key information generated in the image forming apparatus 1 from the image forming apparatus 1 to the portable information terminal 2 is made via NFC communication. The portable information terminal 2 stores the key information received via the information communication in the storage 23. Thereafter, at the start of information communication via Bluetooth communication between the portable information terminal 2 and the image forming apparatus 1, the portable information terminal 2 makes information communication for transmitting the key information received and stored during NFC communication from the portable information terminal 2 to the image forming apparatus 1 via Bluetooth communication.

The image forming apparatus 1 compares the key information received via the information communication with the key information stored at the start of the NFC communication thereby to confirm that the portable information terminal which acquires the card information on the basis of the card emulation function is the same as the portable information terminal which makes Bluetooth communication. Specifically, when the compared items of key information match with each other, the image forming apparatus 1 determines that the portable information terminal which acquires the card information on the basis of the card emulation function is the same as the portable information terminal which makes Bluetooth communication, continues communication, and performs the image forming processing and the charging processing. On the other hand, when the compared items of key information are different from each other, the image forming apparatus 1 determines that the portable information terminal which acquires the card information on the basis of the card emulation function is not the same as the portable information terminal which makes Bluetooth communication, disconnects communication, and does not perform the image forming processing and the charging processing.

With the control to confirm a portable information terminal to be communicated, the image forming apparatus 1 in the network system 10 can confirm that the portable information terminal which acquires the card information on the basis of the card emulation function is the same as the portable information terminal which makes Bluetooth communication, thereby preventing the image forming processing and the charging processing from being illegally performed via illegal Bluetooth communication due to impersonation.

[Other Exemplary Configuration]

The image forming apparatus 1 has been described by way of MFP, but is not limited thereto and may be other image forming apparatus such as copying machine, printer, or facsimile.

The image forming apparatus 1 has been described assuming that the second communication system for performing the image forming processing and the charging processing employs Bluetooth communication, but any communication system other than Bluetooth communication, which is different from the first communication system such as NFC communication, may be employed, and other near field communication system such as Wi-Fi communication and ZigBee communication may be employed.

The first communication system for transmitting the card information from the portable information terminal 2 to the image forming communication 1 may employ any of non-contact type communication and contact-type communication.

The portable information terminal 2 has been described by way of general-purpose portable information terminal such as Smartphone, but a dedicated portable information terminal only for operating a specific apparatus such as the image forming apparatus 1 may be employed.

Card emulation is performed by the card emulation function of the portable information terminal 2, and the card for the charging processing has been described by way of a card capable of electronic money transaction, but is not limited thereto and may be other card capable of transaction such as credit card or may be a card available for both electronic money transaction and other transaction.

The network system 10 may be realized by manufacturing the image forming apparatus 1, the portable information terminal 2, and the charging server 3, which newly incorporate the information processing programs for making various types of communication and performing the image forming processing and the charging processing. The network system 10 may be realized by installing the information processing programs for making various types of communication and performing the image forming processing and the charging processing in the existing image forming apparatus 1, the portable information terminal 2, and the charging server 3.

Although embodiments of the present invention have been described and illustrated in detail, the disclosed embodiments are made for purposes of illustration and example only and not limitation. The scope of the present invention should be interpreted by terms of the appended claims. The scope of the present invention is intended to include all modifications within the same meaning and range as those of equivalents of the appended claims. In addition, the inventions described in the embodiments and modifications are intended to be implemented alone or in combination as much as possible.

What is claimed is:

1. A network system capable of making communication between a portable information terminal and an image forming apparatus, the network system comprising:
    a charging processor that performs a charging processing for image forming in the image forming apparatus,
    wherein the image forming apparatus comprises:
        a first communication part that makes communication in a first communication system;
        a second communication part that makes communication in a second communication system; and
        an information reader that reads card information,
    the portable information terminal comprises:
        a first terminal communication part that makes communication in the first communication system;
        a second terminal communication part that makes communication in the second communication system; and
        a card emulator that is operated in a card emulation function,
    the information reader reads card information of a card emulated in the card emulation function from the portable information terminal when communication is made with the portable information terminal in the first communication system by the first communication part and the first terminal communication part, and
    the charging processor starts the charging processing when the card information of the portable information terminal is read by the information reader, and performs the charging processing when communication is made between the portable information terminal and the image forming apparatus in the second communication system by the second terminal communication part and the second communication part.

2. The network system according to claim 1,
    wherein the charging processing is sequentially performed whenever image forming is performed in the image forming apparatus while communication is made between the portable information terminal and the image forming apparatus in the second communication system.

3. The network system according to claim 2,
    wherein image forming is stopped in the image forming apparatus and the charging processing is stopped when communication is not made between the portable information terminal and the image forming apparatus in the second communication system.

4. The network system according to claim 1,
    wherein when communication is not made between the portable information terminal and the image forming apparatus in the second communication system, image forming is stopped in the image forming apparatus and the charging processing is collectively performed for image forming while communication is made in the second communication system.

5. The network system according to claim 1, further comprising:
    a continuation operation part that continues to perform image forming in the image forming apparatus and enables the charging processing to be performed even when communication is not made between the portable information terminal and the image forming apparatus in the second communication system.

6. The network system according to claim 1, further comprising:
    a stop operation part that can stop the image forming and the charging processing in the image forming apparatus.

7. The network system according to claim 1, further comprising:
    a notification part that can notify that image forming is not performed in the image forming apparatus when communication is not made between the portable information terminal and the image forming apparatus in the second communication system.

8. The network system according to claim 1, further comprising:
    a non-communication state solution part that can continue to perform image forming in the image forming apparatus and can perform the charging processing when communication is restarted in the second communication system within a predetermined time after communication is not made between the portable information terminal and the image forming apparatus in the second communication system.

9. The network system according to claim 1, wherein the image forming apparatus further comprises a confirmation part that confirms whether the second terminal communication part and the card emulator are included in the same portable information terminal.

10. An image forming apparatus capable of making communication with a portable information terminal and enabling a charging processing for image forming, the image forming apparatus comprising:
   a first communication part that makes communication in a first communication system;
   a second communication part that makes communication in a second communication system; and
   an information reader that reads card information,
   wherein the information reader reads card information of a card emulated in a card emulation function in the portable information terminal when communication is made with the portable information terminal in the first communication system by the first communication part,
   the charging processing can be started when the card information of the portable information terminal is read by the information reader, and
   the charging processing can be performed when communication is made with the portable information terminal in the second communication system by the second communication part.

11. A non-transitory recording medium storing a computer readable information processing program executed in an image forming apparatus capable of making communication with a portable information terminal and enabling a charging processing for image forming, the program being directed to perform:
   making communication with the portable information terminal in a first communication system;
   reading card information of a card emulated in a card emulation function in the portable information terminal;
   enabling the charging processing to be started when the card information is read;
   making communication with the portable information terminal in a second communication system; and
   enabling the charging processing to be performed when communication is made with the portable information terminal in the second communication system.

12. A portable information terminal that can make communication with an image forming apparatus enabling a charging processing for image forming, the portable information terminal comprising:
   a first terminal communication part that makes communication in a first communication system;
   a second terminal communication part that makes communication in a second communication system;
   a card emulator that is operated in a card emulation function,
   wherein card information of a card emulated in the card emulation function of the card emulator is read by the image forming apparatus when communication is made with the image forming apparatus in the first communication system by the first terminal communication part,
   the charging processing is started when the card information of the card emulated in the card emulation function is read, and
   the charging processing can be performed when communication is made with the image forming apparatus in the second communication system by the second terminal communication part.

13. A non-transitory recording medium storing a computer readable information processing program executed in a portable information terminal that can make communication with an image forming apparatus enabling a charging processing for image forming, the program being directed to perform:
   making communication in a first communication system;
   making communication in a second communication system; and
   operating in a card emulation function,
   wherein the operating in the card emulation function includes causing card information of a card emulated in the card emulation function to be read by the image forming apparatus when communication is made with the image forming apparatus in the first communication system,
   the charging processing is started when the card information of the card emulated in the card emulation function is read, and
   the charging processing can be performed when communication is made with the image forming apparatus in the making communication in the second communication system.

* * * * *